US012419316B2

(12) United States Patent
Van Appeldoorn et al.

(10) Patent No.: US 12,419,316 B2
(45) Date of Patent: Sep. 23, 2025

(54) PACKAGED FOOD PRODUCTS

(71) Applicant: Mars, Incorporated, McLean, VA (US)

(72) Inventors: Cornelis Jan Van Appeldoorn, Oud Beijerland (NL); Paul Alois Maria Otten, Olen (BE); Annica Bonna, Oud Beijerland (NL); Martijn Johannes Maria De Vries, Oud Beijerland (NL); Marcel Christian Anthony Velthuis, Oud Beijerland (NL)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 16/551,210

(22) Filed: Aug. 26, 2019

(65) Prior Publication Data

US 2019/0373923 A1    Dec. 12, 2019

Related U.S. Application Data

(63) Continuation of application No. 15/441,049, filed on Feb. 23, 2017, now abandoned, which is a
(Continued)

(30) Foreign Application Priority Data

May 29, 2007  (GB) ...................................... 0710228
Aug. 9, 2007  (GB) ...................................... 0715579
Jan. 21, 2008  (GB) ...................................... 0801052

(51) Int. Cl.
*A23B 2/10*    (2025.01)
*A23B 2/22*    (2025.01)
(Continued)

(52) U.S. Cl.
CPC ................ *A23B 2/103* (2025.01); *A23B 2/22* (2025.01); *B65B 7/28* (2013.01); *B65B 25/001* (2013.01);
(Continued)

(58) Field of Classification Search
None
See application file for complete search history.

(56) References Cited

U.S. PATENT DOCUMENTS 2,898,214 A  *  8/1959  Ferrel .................... B65B 25/001
                                                        426/309
3,332,788 A  *  7/1967  Barnby ................. B67C 7/0073
                                                        53/88
(Continued)

FOREIGN PATENT DOCUMENTS

EP    0570122 A2 * 11/1993 ........... B65B 25/001
EP    0691082 A1 *  1/1996 ............... A23L 3/04
(Continued)

OTHER PUBLICATIONS

Khatoon, N. and Prakash, J. "Nutritional Quality of Microwave and Pressure Cooked Rice (*Oryza sativa*) Varieties." Food Sci Tech Int 2006; 12(4):297-305 (Year: 2006).*
(Continued)

*Primary Examiner* — Viren A Thakur
(74) *Attorney, Agent, or Firm* — Baker Botts L.L.P.

(57) ABSTRACT

A method for the production of a stabilized packaged food product comprising the steps of: filling a tray with a predetermined quantity of a food starting material; introducing the tray into a pressure vessel and conveying the tray through the pressure vessel while performing the following steps in sequence inside the pressure vessel: (i) treating the food starting material with high-temperature pressurized steam to sterilize the material, and (ii) dosing the sterile food material
(Continued)

inside said tray with a predetermined amount of sterile water; and (iii) applying a lid to the tray to seal the food product inside the tray while maintaining the tray in a sterile environment. Suitable food starting materials comprise starchy food products, such as rice, wheat or pasta, and/or meat or vegetable pieces. Also provided are an apparatus for performing the method and packaged stabilized full moisture food products obtainable by the process.

10 Claims, 2 Drawing Sheets

Related U.S. Application Data continuation of application No. 12/601,920, filed as application No. PCT/IB2008/002120 on May 29, 2008, now abandoned.

(51) Int. Cl.

| | | |
|---|---|---|
| *B65B 7/28* | (2006.01) | |
| *B65B 25/00* | (2006.01) | |
| *B65B 25/04* | (2006.01) | |
| *B65B 25/06* | (2006.01) | |
| *B65B 25/22* | (2006.01) | |
| *B65B 29/08* | (2006.01) | |
| *B65B 31/02* | (2006.01) | |
| *B65B 55/02* | (2006.01) | |
| *B65B 55/10* | (2006.01) | |
| *B65B 55/18* | (2006.01) | |
| *B65D 81/34* | (2006.01) | |

(52) U.S. Cl.
CPC ............ *B65B 25/04* (2013.01); *B65B 25/062* (2013.01); *B65B 25/065* (2013.01); *B65B 25/22* (2013.01); *B65B 31/028* (2013.01); *B65B 55/025* (2013.01); *B65B 55/18* (2013.01); *B65D 81/3453* (2013.01); *A23V 2002/00* (2013.01); *B65B 29/08* (2013.01); *B65B 55/10* (2013.01)

(56) References Cited

U.S. PATENT DOCUMENTS

| | | | | | |
|---|---|---|---|---|---|
| 3,495,989 | A | * | 2/1970 | Lewis | A23L 7/101 |
| | | | | | 426/451 |
| 3,892,874 | A | * | 7/1975 | Ando | A23L 7/111 |
| | | | | | 426/303 |
| 4,361,593 | A | * | 11/1982 | Brooks | A23L 7/196 |
| | | | | | 426/461 |
| 5,089,281 | A | * | 2/1992 | Baz | A23L 7/196 |
| | | | | | 426/460 |
| 5,283,033 | A | * | 2/1994 | Dodrill | A23L 3/10 |
| | | | | | 422/21 |
| 5,308,632 | A | * | 5/1994 | Howard | A23L 3/3508 |
| | | | | | 426/460 |
| 5,834,049 | A | * | 11/1998 | Kageyama | A23L 3/185 |
| | | | | | 426/511 |
| 5,860,356 | A | * | 1/1999 | Kageyama | A23B 9/025 |
| | | | | | 99/356 |
| 2004/0156962 | A1 | * | 8/2004 | Lee | A23L 7/1965 |
| | | | | | 426/106 |

FOREIGN PATENT DOCUMENTS

| | | | | | |
|---|---|---|---|---|---|
| JP | 09172992 | A | * | 7/1997 | ............ A23B 9/025 |
| JP | 2004248538 | A | * | 9/2004 | |
| JP | 2004283084 | A | * | 10/2004 | |
| JP | 2005124462 | A | * | 5/2005 | ........... A23L 3/0155 |
| KR | 20040095499 | A | * | 11/2004 | |

OTHER PUBLICATIONS

"Sage V Food." Jan. 6, 2007 http://web.archive.org/web/20070106224659/http://www.sagevfoods.com/MainPages/Rice101/Cooking.htm (Year: 2007).*
MacScouter. Feb. 10, 2007 https://web.archive.org/web/20070210193640/http://www.macscouter.com/Cooking/CampingFood.html (Year: 2007).*
Dailey, Pat "Brown, White, Long, Short: A Guide to Rice Types." Chicago Tribune, Sep. 8, 1994 <https://www.chicagotribune.com/news/ct-xpm-1994-09-08-9409080159-story.html> (Year: 1994).*
FDA—Guidance for Industry—Sterile Drug Products Produced by Aseptic Processing—Current Good Manufacturing Practice Sep. 2004, 63 pages. <https://www.fda.gov/media/71026/download> (Year: 2004).*

* cited by examiner

PACKAGED FOOD PRODUCTS

The present invention relates to stabilized, packaged, full moisture food products and to methods and apparatus for the preparation thereof. It relates in particular to stabilized, packaged, full-moisture food products containing cereals such as rice, wheat or pasta, and/or other ingredients such as vegetables and meat.

It is known to provide packaged, full-moisture precooked food products, such as soups, stews, and rice, pasta or wheat (bulgur) products that can be reheated in a short time, for example in a microwave oven. These products are sometimes referred to as "ready-to-heat" or "one-minute" products.

The high moisture content of these ready-to-heat products requires special steps to be taken in order to render them sufficiently stable for storage and distribution through conventional retail channels.

U.S. Pat. No. 4,986,995 describes a process for the preparation of shelf-stable rice. The process includes soaking dry rice in water at 20° C., introducing the rice into a container such as a pouch together with sufficient water to hydrate the rice to a full moisture product, sealing the pouch with a restricted amount of oxygen in the pouch, and then cooking and sterilizing the rice in the pouch by heating in an autoclave to a temperature of at least 121° C. The resulting shelf-stable rice product can be microwave-heated in the pouch before serving. Unfortunately, the time-temperature-moisture conditions required to achieve sterility cause some chemical modification of the food starch, resulting in a tendency of the full-moisture sterile product to agglomerate over time. As a result of this agglomeration the rice does not have the optimum freshly-cooked texture and free-flowing properties. Furthermore, the autoclave cooking within the sealed pouch can result in some undesirable aroma of the product, especially when the pack is first opened.

EP-A-0602953 describes shelf-stable microwaveable pouches containing full moisture precooked rice. The rice has been acidified by the addition of enough edible acid to lower its pH to a range of 3.5 to 4.6. This enables a shelf-stable product to be achieved by heat treatment at lower temperatures than are needed for a non-acidified product, resulting in improved texture and flow properties compared to the autoclaved rice products. Further acid-stabilized rice products are described in U.S. Pat. No. 5,702,745 and EP-A-1338209. Unfortunately, the addition of an edible acid to the rice gives rise to acid flavor notes that reduce consumer acceptability of the product. EP-A-0322996 teaches to overcome this problem by packaging the stabilized rice with a neutralising agent that can be mixed with the rice immediately before consumption.

EP-A-0691082 describes a plant for the production of packaged, stabilized, ready-to-heat cooked meals such as pasta. The plant comprises an autoclave body defining a food-processing chamber having a conveyor therein for conveying open trays containing a food product from an inlet end of the autoclave to an outlet end thereof. The autoclave comprises, in succession, between the inlet and outlet ends: a) a first region which includes means for dispensing steam for the heat stabilisation and/or sterilisation of the food and of the open trays, b) a second region which includes a spray for delivering boiling water for cooking the food in the respective trays, c) a straining region which includes a device for inverting the trays for removing the excess cooking liquid from the cooked food while retaining the cooked food in the respective containers. The system includes a sealing assembly for hermetically sealing the trays. The sealing assembly is located in a sterile environment communicating with the sterile cooking chamber.

U.S. Pat. No. 5,860,356 describes a system for providing a sterile, full-moisture packaged rice product. The system includes a rice filling device that fills individual trays with a predetermined quantity of washed and soaked rice. The trays are then conveyed through a sterilization chamber that substantially air-tightly contains one or more of arrays of the trays for sterilizing the rice with high-temperature pressurized steam introduced into the chamber. The trays are then transferred to a steaming chamber separate from the sterilization chamber and at ambient pressure, where a water filling device fills the trays containing the sterilized rice with a predetermined quantity of water necessary for steam rice-cooking, and the rice is cooked with steam for a suitable period, for example 30 minutes. The trays containing the cooked rice are then conveyed to a sealing device in a clean booth that applies an air-tight lid to the trays containing the cooked rice. Since the clean booth does not completely prevent contamination of the rice before sealing, the packaged products are subjected to a final steaming step to achieve the desired rice quality and stability. Processes of this type are also described in US-A-20040219267.

The overall processes of EP-A-0691082 and U.S. Pat. No. 5,860,356 are capital intensive because of the multiple process steps. The total time/temperature/moisture exposure of the products is considerable, and in the case of starchy products these processes can result in products that are sticky, not free-flowing, and not ideal texture.

In a first aspect, the present invention provides a method for the production of a stabilized packaged food product comprising the steps of: filling a tray with a predetermined quantity of a food starting material; introducing the tray into a pressure vessel and conveying the tray through the pressure vessel while performing the following steps in sequence inside the pressure vessel: (i) treating the food starting material with high-temperature pressurized steam to sterilize the material, and (ii) dosing the sterile food material inside said tray with a predetermined amount of sterile water; and (iii) applying a lid to the tray to seal the food product inside the tray while maintaining the tray in a sterile environment.

The feature of steam sterilizing and water dosing the food product sequentially under sterile steam conditions, followed promptly by sealing the trays under sterile conditions in the steam pressure vessel, provides a very rapid route to commercially sterile products with minimum capital assets. It has been found that extended cooking of the food product following the dosing step is not needed in order to achieve a stable, full moisture, ready-to-heat product. Further advantages of the process are discussed below.

The initial step of the process comprises filling trays with a predetermined quantity of food starting material. The trays may be formed of any suitable material that is sufficiently heat resistant to keep its shape in the subsequent steps of the process. Thermoformed polypropylene (PP), polyethylene terephthalate (PET) or CPET trays may be suitable, preferably with an ethylene vinyl alcohol (EVOH) oxygen barrier layer. For example a PP-EVOH-PP laminate may be suitable, with the PP selected to provide the necessary heat resistance at 135° C. The laminate thickness is suitably from about 0.8 mm to about 1.5 mm, for example about 1 mm to about 1.2 mm. The tray suitably has a bottom, straight or tapered side walls, and a flange (lip) at the top for sealing. The bottom and/or the side walls may be profiled in various ways for decorative or structural reasons. In certain embodiments, the tray may be substantially in the shape of a bowl to assist consumption of the food product directly from the tray. Metal foil or metal/polymer laminate trays could also be used, but are not so suitable for subsequent microwave reheating of the food product before consumption. The tray may include metallised susceptor regions to provide localized heating in a microwave oven.

The depth of the tray and quantity of starting material are normally selected so as to produce a substantially filled tray when hydration of the contents is complete. The starting material is filled into the trays in a layer (bed) that is preferably not more than about 3 cm deep, for example from about 0.2 to about 2 cm deep. A uniform bed of food product is desirable, and accordingly the bed height is preferably equalized before performing subsequent steps of the process.

The food starting material in the processes of the present invention may be any dry or wet solid food material. The process is applicable to both human foods and animal (pet) foodstuffs. The overall moisture content of the starting material is suitably less than the overall moisture content in the packaged product, but in certain embodiments a full moisture starting material or materials may be used. For example, the food starting material may comprise partially or completely dehydrated food ingredients such as freeze-dried meat or vegetable ingredients, or dehydrated milk or sauce components.

The food starting material may alternatively or additionally comprise cooked or uncooked fruit or vegetable pieces, mushroom pieces, nuts, salad pieces, herb pieces, whole herbs such as cloves, anise or cardamom, meat or fish. The starting material pieces may be chilled or even frozen. Suitably, vegetable starting materials (including potato) are substantially full-moisture. In certain embodiments, the food starting material consists of solid soup components, such as meat, vegetable and/or cereal pieces. In these embodiments, a larger amount of sterile liquid is dosed in the dosing step of the process to result in a sterile, liquid soup or sterile soup concentrate containing the solid pieces. It is an advantage of the present process that the relatively brief heat treatment to which the products are subjected causes relatively little deterioration of the appearance and texture of fresh food pieces compared to a conventional autoclaving process.

In certain embodiments, the food starting material comprises or consists essentially of at least one dry starchy component, such as rice, wheat, pulses (e.g. beans or lentils), or pasta pieces. In certain embodiments, at least 10% by weight of the food starting material is made up of such starchy components, suitably at least about 50% thereof, for example 90% or more of the food starting material is made up of such starchy components. The remainder of the material may be made up of sauce components and vegetable, meat or fish components as described. Typically, the non-starchy components are deposited on a bed of the starchy component in the tray.

The term "dry starchy component" refers to a starchy food starting material having a moisture content below the full moisture content for consumption of starchy food materials of that type. Suitably, the dry starchy component has a moisture content less than about 30 wt %, for example less than about 20 wt. %, suitably less than about 16 wt. %. The dry starchy material typically has a moisture content of about 10-15%, whereby it is storage-stable. The starting material may comprise whole or comminuted food grains such as rice or wheat grains, couscous, bulgur, or pulses such as beans or lentils. The food grains may be fully milled (white), or they may have part or all of the bran layer still attached. The grains may suitably be parboiled. In certain embodiments, the starting material may comprise or consist essentially of dried pasta pieces. In other embodiments, the starting material comprises or consists essentially of dry, milled, parboiled rice having a moisture content of about 10% to about 15%. Long-grain rice, basmati rice, Thai rice, wild rice and Arborio rice are all suitable for the process of the present invention.

It is an advantage of the present invention that the food starting material generally does not require soaking or wetting before introduction into the pressure vessel. Indeed, at least a major portion by weight of the starting material is generally not soaked or wetted before introduction into the pressure vessel, since the sterilization step is preferably carried out on a dry product in order to minimize heating time, and to minimize thermal damage to the food components such as starch. This is a simplification over the process described in U.S. Pat. No. 5,860,356.

The trays containing the food starting material are introduced into a pressure vessel, for example through a suitable pressure lock. Preferably the pressure lock permits continuous feeding of the trays to the pressure vessel. Exemplary pressure locks and tray conveyors are described in EP-A-0691082.

The pressure vessel may consist of a single pressure chamber, or it may comprise two, three or more pressure chambers separated by pressure locks. The use of multiple pressure chambers to form the pressure vessel enables process parameters to be controlled further by varying the steam pressure and temperature between the chambers. In addition, it allows individual pressure chambers to be isolated for cleaning or maintenance. The pressure vessel (or chamber thereof) is suitably in the form of a tube having a conveyor therein for conveying the trays along the tube. The diameter of the tube is typically about 30 cm to about 100 cm, for example about 50 cm. The total length of the pressure vessel (i.e. the sum of the lengths of the pressure chambers) is typically about 10 m to about 50 m, for example about 15 m to about 40 m. The pressure vessel is thermally insulated to minimise heat loss and steam condensation within the vessel. The pressure vessel is pressurized with steam, optionally mixed with other gases. The steam may be saturated or superheated. The steam temperature is suitably from about 100° C. to about 160° C., preferably from about 125° C. to about 150° C., for example about 135° C. The temperature inside the pressure vessel (or each chamber thereof) is thereby maintained substantially at the steam temperature. Suitably, the gauge pressure in the pressure vessel (or each chamber thereof) is from about 0.05 MPa to about 1.0 MPa, preferably from about 0.1 MPa to about 0.5 MPa, for example about 0.3 MPa to about 0.4 MPa. The temperatures and pressures in each chamber of the pressure vessel may be the same or different within the above ranges.

The steam is may be injected through suitable nozzles. In certain embodiments, the steam impinges directly onto the top surface of the food bed as the trays move through the tube. In other embodiments, the steam in injected below and/or laterally to the trays. Steam injection may be intermittent or continuous. Improved energy efficiency is achieved by using intermittent injection of (preferably saturated) steam, preferably with forced flow inside the pressure vessel to circulate the steam. The forced flow can be achieved, for example, by providing fans within the vessel. The high temperature of the steam causes the core temperature of the food to rise quickly to a value sufficient to cause rapid sterilization. Uptake of water by the food in this stage of the process is minimal. Typically, with steam at about 135° C., trays containing only rice or wheat are exposed to the steam for a period of from about 20 seconds to about 1 minute, for example about 20 seconds to about 1 minute. Longer steam sterilization, typically about 3 to about 4 minutes, is needed if the trays contain larger pieces, such as vegetable pieces, meat pieces, or large pasta pieces, or if lower steam temperatures are used. The duration of the steam sterilization step is typically regulated by moving the location of the water dosing point in the pressure tube, as described further below. Alternatively or additionally, the duration of the steam sterilization step may be regulated by varying the speed of the conveyor.

The sterilization time and temperature are suitably selected to provide a reduction of 12D (i.e. 12 orders of magnitude) of the population of the microorganism *Clostridium botulinum*. The minimum lethality factor $F_o$ (equivalent to number of minutes of treatment at 121.1° C.) needed to achieve 12D reduction is 2.4 minutes. In practice, a higher lethality factor, generally of at least about 3, for example about 5, is applied in order to provide a safety margin and optionally to inactivate other, more resistant spores, such as *B. Stearothermophilus*.

It is an advantage of the present invention that the sterilization step may be performed on the food while the food is still dry. This avoids many of the problems caused by prior art processes in which the sterilization temperatures are applied to hydrated cereal grains, or to cereal grains in contact with liquid water. In particular, the present invention results in a more free-flowing final product exhibiting less damage to the starch structure, for example exhibiting less de-retrogradation of the starch and less extrusion of soluble starches from the product grains. Furthermore, the time required to heat the food particles to sterilization temperatures is greatly reduced, thereby further reducing the process time and damage to the starch and other ingredients as compared to prior art processes.

The food product in the trays is conveyed from the steam sterilization zone of the pressure vessel to a dosing station (or separate dosing chamber) inside the pressure vessel, where a predetermined amount of liquid water is dosed into each tray. The pressure and temperature conditions at the dosing station are suitably within the ranges specified above for the steam sterilization step, but need not be the same as those in the steam sterilization step. In particular, the water dosing may be performed in a chamber that is maintained at a low overpressure (e.g. about 0.01-0.3 bar) to maintain sterility. The liquid water is sterile, and is dosed by means of a suitable pump at a temperature suitably of from about 5° C. to about 150° C., preferably about 25° C. to about 99° C.

The term "liquid water" refers to a sterile aqueous liquid. The liquid may further comprise additives, such as herbs, salt, flavorings, nutrients, acidulents, edible oil and/or edible fat. For example, the liquid may comprise or consist of a stock, a bouillon or a soup base. It will be appreciated that the water supply to the dosing nozzles is normally intermittent, so that water is supplied only to the trays in the specified amount and no water is wasted. The duration of the water dosing step is short. Suitably, the liquid water dosing step takes less than about 60 seconds, for example less than about 20 seconds, and typically less than about 10 seconds, for example from about 1 to about 5 seconds. There may be more than one water dosing step, optionally separated by re-heat steps, especially when a substantial amount of water must be dosed, for example in the preparation of soup products.

It is a feature of the present invention that the water is dosed in an amount that is just sufficient to provide a product having the desired final moisture content, i.e. typically about 50 to about 75% moisture for food grains and pasta. There is substantially no addition or loss of water from the product after the dosing step, other than a small amount of condensation from steam in the pressure vessel. This eliminates any need to invert the trays in order to drain off excess water. The amount of water dosed is typically from about 0.01 to about 5 g of water per gram of food starting material, for example about 0.01 to 3.5 g/g for rice, and 0.01 to 4 g/g for pasta and couscous. A substantially larger amount of water is dosed for soup products. The measured dosing of water inside the pressure vessel provides a number of advantages over the process of EP-A-0691082, in which the trays are simply sprayed with excess boiling water. These advantages include reduced energy consumption, reduced waste water, reduced loss of nutrients, and reduced capital cost as it is no longer necessary to provide a mechanism to drain the excess water from the product. Likewise, the process of the present invention eliminates the need for a separate steaming chamber and prolonged cooking step as described in U.S. Pat. No. 5,860,356. The present inventors have made the surprising finding that simply dosing the precise amount of water required onto the hot food product, followed directly by sealing under sterile conditions, results in an excellent, stable, full-moisture product after a suitable period for moisture equilibration of the product at ambient or moderately elevated temperature, as explained further below.

Suitably, directly following the sealing step, the product cooled to a temperature less than about 100° C., is transferred to atmospheric pressure and stored in an environment maintained at less than about 80° C., for example about 25°-80° C., and tempered at this temperature for a period of from about 20 minutes to about 4 hours, for example about 30 minutes to about 150 minutes, to achieve the desired product characteristics. Suitable long-grain rice tempering conditions are 30 minutes in an environment maintained at 55° C. followed by 15 minutes in an environment maintained at 45° C. Suitable basmati rice tempering conditions are 30 minutes in an environment maintained at 75° C., followed by 30 minutes in an environment maintained at 45° C. In certain embodiments, tempering may be achieved by stacking the trays and allowing them to cool to ambient temperature over a period of at least about 1 hour, for example 3-4 hours. Certain embodiments, such as soups, do not require any tempering.

Suitably, the temperature of the food bed is at least about 120° C., for example from about 125° C. to about 150° C. immediately before the water is dosed. As noted above, it is an advantage of the present invention that an extended cooking step is not needed in order to achieve complete hydration of the food. Suitably, the interval between the water dosing and sealing of the trays is less about 2 minutes, preferably less than about 1 minute, and more preferably less than about 30 seconds. Likewise, the interval between the liquid water dosing and removal of the trays from the pressure vessel is suitably less than about 2 minutes, preferably less than about 1 minute, and still more preferably less than about 30 seconds.

The food product immediately following the dosing and sealing steps may not be ready to consume, since not all of the water may be absorbed instantly and the water distribution in the food pieces is not initially uniform. Nevertheless, it has been found that the moisture distribution in the food pieces (such as rice grains) becomes uniform within a few hours at ambient temperature, or after tempering as described above, to give a highly satisfactory product.

The trays containing the hydrated food are sealed by application of a lid to the trays while maintaining the trays in the sterile environment of the pressure vessel (or separate sealing chamber thereof) following the dosing step(s) and any optional reheat step(s) following the dosing step(s). The lid is suitably formed of a film or foil sheet that is stable at the temperature inside the pressure vessel. The cover sheet (lid) may be formed of a suitable heat-resistant laminate comprising a sealing layer such as PP and a barrier layer such as EVOH. The thickness of the cover sheet is suitably from about 50 µm to about 250 m, for example from about 100 µm to about 150 µm. The trays are suitably maintained continuously in a sterile environment between the dosing step and completion of the sealing step in an atmosphere of steam at a temperature and pressure within the ranges specified above for the steam sterilization and dosing steps. This ensures that sealing is performed under fully sterile conditions, thereby eliminating the need for subsequent heat treatment steps to achieve a shelf stable product.

In certain embodiments, the film or foil sheet is fed continuously (as a continuous strip) into the pressure vessel through a suitable pressure lock. The pressure lock may, for example, comprise a series of rollers or belts between which the sheet is pinched, whereby the pressure applied across the sheet at any point does not cause permanent compression of the sheet. The film or foil sheet may be releasably laminated to a continuous support strip (e.g. a release-coated paper) to provide the necessary tensile strength after sealing for the residue of the film or foil sheet to be wound up. The support strip also enables the continuous film or foil sheet to be die-cut with appropriate lid shapes before feeding to the pressure vessel. In other embodiments, pre-cut film or foil lids are fed to the sealing apparatus inside the pressure vessel.

The temperature inside the pressure vessel is sufficient to sterilize the lid before it is applied. The lid can be attached to the tray in airtight fashion by means of ultrasonic or thermal sealing. Ultrasonic converters suitable for sealing trays inside sterile enclosures are described, for example, in WO96/09932.

In any event, the hydrated food product inside the trays preferably exits from the pressure vessel at a temperature sufficiently low to avoid the risk that steam pressure inside the sealed package could cause the package to burst. For example, the food product may return to ambient pressure at a temperature less than about 110° C., suitably about 100° C. or less. For this purpose, the outlet pressure lock may comprise a cooling stage.

An important advantage of the processes according to the present invention is the short processing time. The total residence time of the trays in the pressure vessel is typically from about 20 seconds to about 6 minutes, for example from about 30 seconds to about 4 minutes. The total treatment time of the trays from entry into the pressure vessel to exit of the sealed trays from the pressure vessel (or the sealing chamber, when sealing is performed in a separate chamber) to the ambient atmosphere is typically from about 20 seconds to about 6 minutes, for example from about 30 seconds to about 5 minutes. The total treatment time depends primarily on the recipe. The processing time for plain rice products is at the low end of the above ranges. The processing time for more complex recipes containing vegetable pieces is at the long end of the above ranges.

For example, a typical protocol for the preparation of a sterile full-moisture rice product from parboiled long-grain rice comprises steam sterilization for 24 seconds (excluding a few seconds for in-feed and out-feed time), followed by dosing (about 2 seconds). In some cases, e.g. for basmati rice, the dosed rice is held for a further 30 seconds in the pressure vessel to heat up the mixture of liquid and solids prior to sealing.

No pre-processing of the food by soaking or wetting is required for most ingredients (pulses and mushrooms may benefit from a preliminary soak). No post-processing of the packaged product by steaming or cooking at environmental temperatures above about 80° C. is normally required. As well as giving a less thermally degraded product, the present high-speed process requires less capital for equipment than most previous processes, and less energy. It can be seen that a further advantage of the process according to the present invention is that it generates only minimal quantities of waste water. A further advantage of the present process is that it is a robust aseptic process that normally does not require the use of a clean room or booth.

Accordingly, in a further aspect, the present invention provides a method for the production of a stabilized packaged food product comprising the steps of: filling a tray with a predetermined quantity of a food starting material, followed by performing the following steps in sequence while maintaining the tray in a sterile environment: (a) treating the food starting material with high-temperature pressurized steam in a pressure vessel to sterilize the material; (b) dosing the sterile food material inside said tray with a predetermined amount of sterile water; and (c) applying a lid to the tray to seal the food product inside the tray; followed by removing the tray from the sterile environment, wherein the residence time of the tray in the sterile environment is less than about 10 minutes. Suitably, the residence time is less than about 6 minutes, for example from about 20 seconds to about 6 minutes, typically from about 30 seconds to about 5 minutes.

In a further aspect, the present invention provides a method for the production of a stabilized packaged food product comprising the steps of: filling a tray with a predetermined quantity of a food starting material, followed by performing the following steps in sequence while maintaining the tray in a sterile environment: (a) treating the food starting material with high-temperature pressurized steam in a pressure vessel to sterilize the material; (b) dosing the sterile food material inside said tray with a predetermined amount of sterile water; and (c) applying a lid to the tray to seal the food product inside the tray; followed by removing the tray from the sterile environment, wherein the duration of the process from the start of step (a) to the completion of step (c) is less than about 10 minutes. Suitably, said duration is less than about 6 minutes, for example from about 20 seconds to about 6 minutes, typically from about 30 seconds to about 5 minutes.

In a further aspect, the present invention provides a method for the production of a stabilized packaged food product comprising the steps of: filling a tray with a predetermined quantity of a food starting material, followed by performing the following steps in sequence while maintaining the tray in a sterile environment: (a) treating the food starting material with high-temperature pressurized steam in a pressure vessel to sterilize the material; (b) dosing the sterile food material inside said tray with a predetermined amount of sterile water; and (c) applying a lid to the tray to seal the food product inside the tray; followed by removing the tray from the sterile environment, wherein the food material is not subjected to a cooking step subsequent to step (b).

The term "cooking step" in the above aspect refers to a heat treatment of the product by exposure of the product to an environmental temperature above about 80° C. for a period greater than about 10 minutes. Suitably, the product according to this aspect is transferred to an environment held at a temperature less than about 80° C., for example less than about 60° C., within about 10 minutes, preferably within about 5 minutes of the completion of the water dosing step (b).

In a further aspect, the present invention provides a method for the production of a stabilized packaged food product comprising the steps of: filling a tray with a predetermined quantity of a food starting material, followed by performing the following steps in sequence while maintaining the tray in a sterile environment: (a) treating the food starting material with high-temperature pressurized steam in a pressure vessel to sterilize the material; (b) dosing the sterile food material inside said tray with a predetermined amount of sterile water; and (c) applying a lid to the tray to seal the food product inside the tray; followed by removing the tray from the sterile environment, wherein a major portion by weight of the food material is not subjected to a wetting or soaking step prior to step (a). The term "a major portion" refers to at least about 50%, for example at least about 75%.

All of the various features described above in relation to the first aspect of the present invention are likewise applicable to the methods according to the further aspects of the invention.

In methods according to the further aspects of the invention, sealing may be performed either in the pressure vessel, or the trays may be transferred from the pressure vessel to a separate sealing chamber or clean booth in sterile communication with the pressure vessel for the sealing step, for example as described in EP-A-0691082. The film or foil sheet may be fed to the sealing chamber or clean booth, with suitable sterilizing means (e.g. steam, UV or peroxide) provided as appropriate. The sealing chamber or clean booth may suitably be maintained at substantially ambient pressure or a slight overpressure (e.g. about 0.01 bar to about 0.3 bar) with sterile filtered air or steam.

In a further aspect, the present invention provides an apparatus for the production of a stabilized packaged food product comprising: a filling device for filling individual trays with a predetermined amount of a food starting material; a pressure vessel having an inlet pressure lock and an outlet pressure lock for transferring said trays into and out of the pressure vessel; a supply of pressurized steam for sterilizing the food starting material in said trays in a first zone of the pressure vessel; a supply of sterile water and a dosing pump for dosing a predetermined amount of sterile water into each of said trays in a second zone of the pressure vessel; and a sealing device located in said pressure vessel for sealing the trays following said step of dosing.

Suitably, the apparatus according to this aspect of the invention comprises a conveyor for conveying the trays through the pressure vessel. The pressure vessel may comprise two or more pressure chambers, as described above. Suitably, the apparatus according to this aspect of the invention is adapted for operation of a process according to the first aspect of the invention. All optional features described above in relation to the first aspect are likewise applicable to the apparatus according to the present aspect.

The term "dosing pump" refers to any pressurizing and dosing apparatus for supplying predetermined doses of liquid to the trays inside the pressure vessel. The dosing pump is suitably adapted for intermittent operation, whereby the pump is operated intermittently to dose water into the trays in the pressure vessel. The apparatus may comprise a plurality of dosing pumps for sequentially dosing each product more than once.

Suitably, the outlet of the pressure vessel or of the separate sterile sealing chamber, communicates in airtight fashion directly with the ambient atmosphere or with a tempering chamber for tempering the product at an environmental temperature below about 80° C. That is to say, the said outlet does not communicate with a further cooking or steaming chamber.

A further advantage of the processes of the present invention is that the resulting stable, packaged ready-to-heat food products do not exhibit the undesirable aroma that can be experienced with in-pouch sterilized precooked products. This advantage could be due to the fact that the present process performs the high-temperature and short-time sterilization on open trays of the products, whereby undesirable aromas evaporate from the product before sealing. Alternatively or additionally, the low moisture content of the product during the high-temperature and short-time sterilization step will reduce the development of the undesirable aroma compounds. In particular, gas chromatography of rice products made according to the invention show lower levels of odorous aldehydes, in particular heptanal and 2,4-decadienals, than were found in pouched ready-to-heat rice products.

Accordingly, in a further aspect, the present invention provides a stabilized, packaged, full-moisture food product obtainable by a process according to the invention.

The term "stabilized" signifies that the product exhibits reduced spoilage upon storage under ambient conditions as compared to a product that has been cooked and packaged under ambient air. Suitably, the food products are shelf-stable or ambient-stable. The term "shelf stable" refers to a product that can be stored at typical chill cabinet temperatures of about 7° C. for a period of at least 1 month, preferably at least 3 months, more preferably at least 6 months and most preferably 1 year, without unacceptable deterioration of organoleptic properties or appearance, or without developing microbiological activity outside regulatory limits. By "ambient stable" is meant a product that can likewise be stored at typical ambient temperatures, such as 20-25° C. at 60% relative humidity, with similar stability.

In certain embodiments, the food products are commercially sterile. Commercial sterility is defined as freedom from viable forms of micro-organisms having public health significance, as well as any micro-organisms of non-health significance capable of reproducing in the food under the normal non-refrigerated conditions of storage and distribution. In yet other embodiments, the food products may be sterile, that is to say completely free from viable microorganisms.

The term "full-moisture" implies that the moisture content of the food product is sufficient to produce a normal, edible product without further hydration. For food products such as rice, wheat or pasta the full moisture content is in the range of from about 50 wt. % to about 75 wt. % moisture. The full moisture products may therefore be ready-to-heat products. In other embodiments, such as salads, the products may be ready to consume directly at ambient temperature, without reheating. In yet other embodiments, such as soup concentrates, the products are fully hydrated but may be suitable for dilution by addition of water to produce a more palatable product.

The food product obtainable by the invention may optionally be acidified, for example salad products (e.g. pasta salad, rice salad) may be acidified to achieve the desired flavor. However, the products are usually sufficiently sterile to be ambient shelf-stable without any need for added acid. Suitably, the pH of the packaged stabilized food product is greater than about 5, for example greater than about 5.5. The pH is determined by liquidising the food product with an equal weight of distilled water in a blender to form a slurry, and measuring the pH of the slurry with a conventional pH electrode.

The packaging is normally in the form of a tray having a bottom, side walls, a flange (lip) extending around the top of the side walls, and a flexible sheet lid bonded to the flange to form a microorganism-impermeable closure. The packaging is substantially impermeable to microorganisms, and it is also substantially impermeable to gases such as oxygen, in order to maintain the freshness of the product. Preferably, the packaging is substantially oxygen-impermeable. Suitable packaging materials have an oxygen permeability at 23° C./50% relative humidity less than about 2 $cm^3/m^2$/day at 1 atm pressure. Suitably, the lid has been bonded to the flange by ultrasonic bonding.

Suitably, the packaging is substantially free of metallic material so that it can be reheated in a microwave oven. In certain embodiments, metallised susceptor regions may be provided to enhance microwave heating. Suitably, all components of the packaging have a softening temperature greater than about 120° C., preferably greater than about 125° C., for example greater than about 140° C.

The components of the food product and packaging are suitably as described above in relation to the first aspect of the invention. Accordingly, the packaged product preferably comprises or consists essentially of full moisture starchy pieces, such as rice grains.

An embodiment of the present invention will now be described further, with reference to the accompanying drawing, in which.

Figure 1:
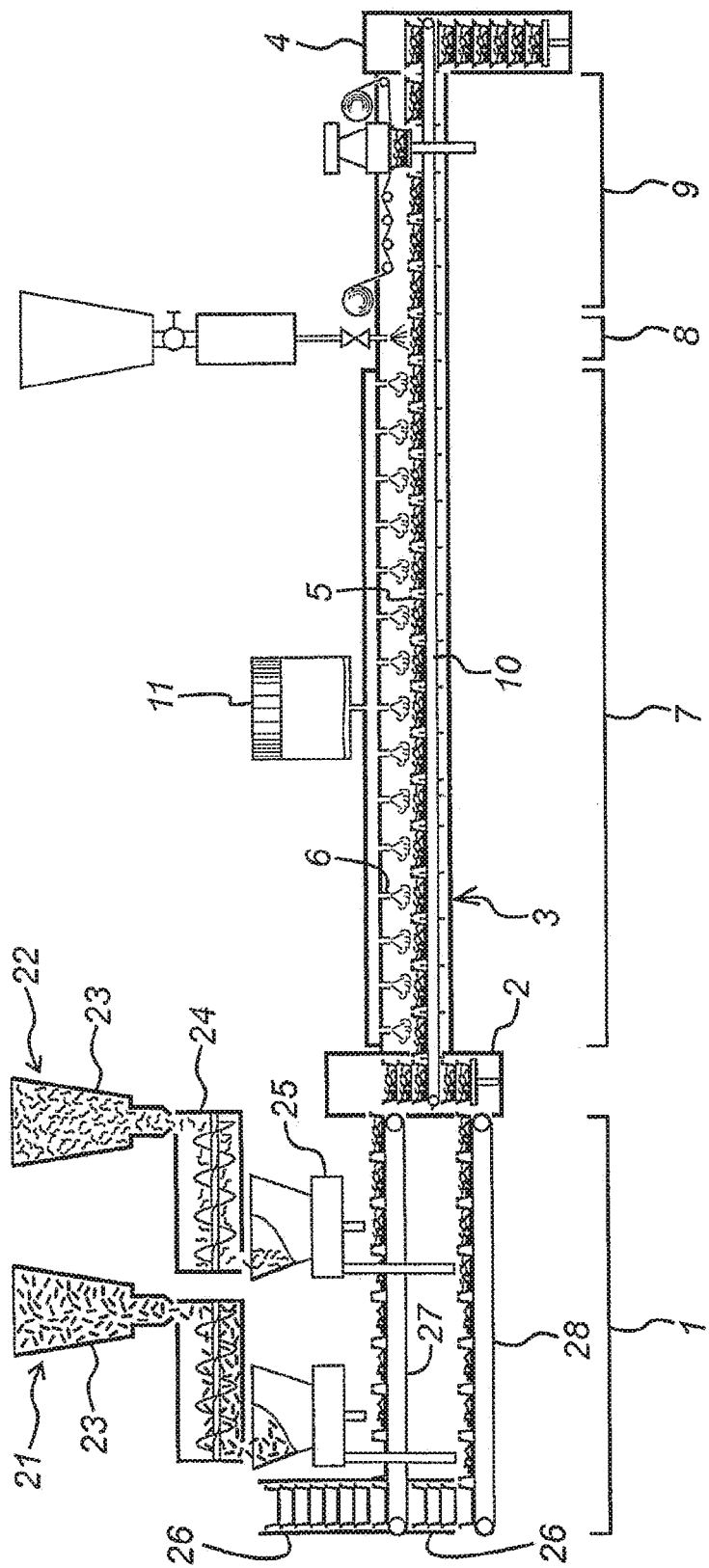
FIG. 1 shows a schematic sectional view of an apparatus according to the invention.

Referring to FIG. 1, the apparatus comprises a tray filling zone 1, an inlet pressure lock 2, a pressure vessel 3, and an outlet pressure lock 4.

The tray filling zone 1 comprises filling stations for loading the trays 5 before they are introduced into the pressure vessel 3. The filling stations comprise a rice filling station 21 and a non-rice filling station 22 for depositing non-rice food pieces such as carrot or mushroom on top of the rice bed. Each filling station comprises a hopper 23, a feeding device 24 and a dosing device 25. Trays 5 are fed from two stacks 26 to two conveyors 27,28 for filling and supply to the inlet pressure lock 2. It will be appreciated that the apparatus may comprise further filling lanes, for example 6, 8 or 12 filling lanes, in order to achieved the desired filling rate of the trays.

The pressure vessel 3 is in the form of a tube of length up to 50 m and diameter approximately 50 cm. The tube is thermally insulated to minimize heat losses. The tube may be subdivided into two or more chambers by pressure locks (not shown) to assist with maintenance and to provide better control of process conditions.

A conveyor 10 is provided within the tube to move trays 5 containing the food product from the inlet to the outlet thereof. The pressure vessel comprises a sterilization zone 7, a water dosing zone 8, and a sealing zone 9. The sterilization zone 7 of the tube 1 proximate to the inlet end is provided with steam spray nozzles 6 for spraying hot steam onto the product bed in trays 5. The steam is supplied from a suitable steam generator 11 through a manifold to the nozzles 6. The temperature of the steam is about 135° C., and the pressure is about 0.3 MPa gauge. Fans (not shown) may be provided to circulate the steam inside the pressure vessel. It has been found that a sterilization time of about 24-30 s is sufficient for dry parboiled long-grain rice, and a sterilization time of about 120 s or more is necessary for 1 $cm^3$ pieces of fresh vegetables such as carrot.

Figure 2:
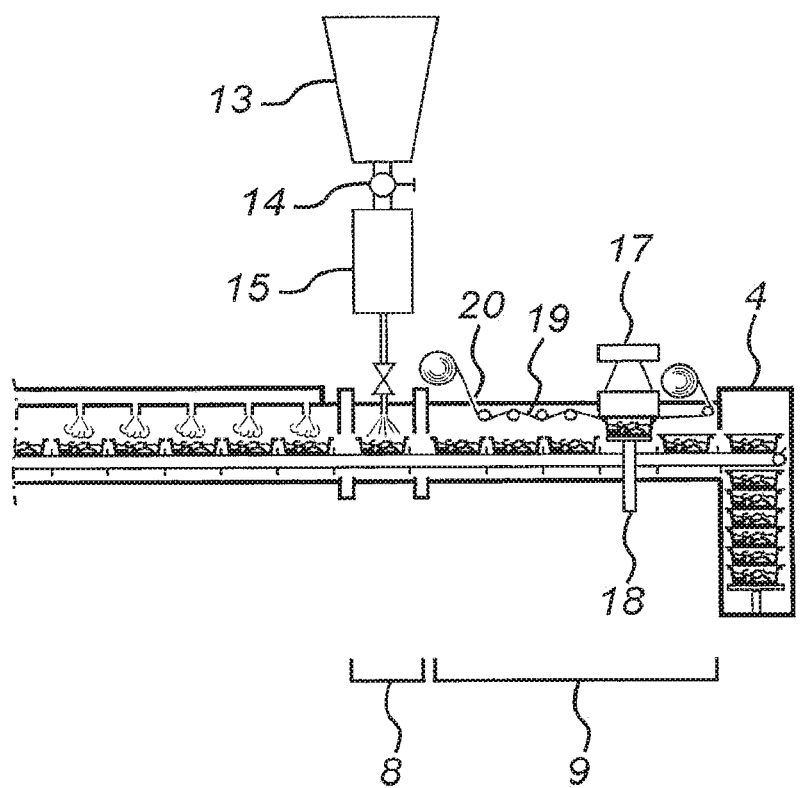
FIG. 2 shows a detail of the dosing and sealing regions of the apparatus of FIG. 1.

The conveyor 10 extends from the sterilizing zone 7 of the pressure tube to the water dosing zone 8. Referring to FIG. 2, the water dosing zone of the apparatus comprises a water supply 13, pump 14 and water sterilizer 15 for dosing predetermined amounts of sterilized aqueous liquid from a nozzle into the trays containing sterile dry rice in the dosing zone. It will be appreciated that more than one dosing apparatus may be provided in the dosing zone to sequentially dose larger quantities of liquid, for example when making soups, with re-heat zones between the dosing apparatuses. The water supplied may contain additional ingredients such as salt, oil, herbs, spices, vegetable particles, bouillon or flavorings. The location of the dosing zone 8 may be moved, depending on the time required for the sterilization step. That is to say, the dosing zone is moved further down the tube if a longer sterilization step is required assuming constant conveyor speed. Alternatively or additionally, the conveyor speed may be adjusted to vary the duration of the steam sterilization step. Just sufficient water is added in the dosing step to increase the moisture content of the rice to about 65-67 wt. %. The temperature of the liquid is adjusted within the range about 5° C. to about 140° C., for example from about 25° C. to about 100° C. depending on the parameters of the system. The water dosing zone 8 is shorter than the sterilizing zone 7, since the time taken to dose the water is very short. The conveyor then extends to a sealing zone 9. The apparatus further comprises an ultrasonic or thermal sealing tool 17 for sealing a plastics foil lid to the trays in the sealing zone. The trays in the sealing zone are lifted into contact with the ultrasonic sealing tool by movable anvil 18. The foil lid is cut from a continuous web 19 of the plastics foil that is fed through a suitable pressure port 20 in the pressure tube. In alternative embodiments, the sealing is performed in a separate sealing chamber in sterile communication with the pressure vessel 3, i.e. downstream of, and in sterile communication with, the pressure lock 3.

The apparatus does not comprise any steaming or cooking equipment downstream of the outlet port. It is an advantage of the apparatus and method of the present invention that no cooking of the packaged products at environmental temperatures above about 80° C. is needed. It is merely necessary to store the products at an environmental temperature typically in the range 40° C.–80° C. for a few hours to achieve a stable, packaged, ready-to-heat rice and vegetable product.

Figure 3:
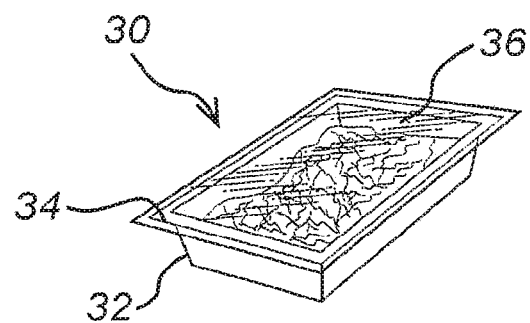
FIG. 3 shows a perspective view of a packaged food product according to the invention.

Referring to FIG. 3, the packaged food product 30 according to the invention comprises full-moisture shelf-stable long-grain rice packaged in a thermoformed tray 32 having a flanged top 34, to which is hermetically bonded a film lid 36.

REFERENCE EXAMPLE 1

A bench-top simulation of the method according to the invention was performed as follows. A polypropylene tray was filled to a depth of about 1 cm with dry, milled, parboiled long-grain rice having moisture content about 14 wt. %. The tray was introduced into a modified small retort and treated with steam at 135° C. for a time sufficient to achieve $F_o$ of 5 minutes. The tray was then removed from the retort and liquid water at 100° C. was immediately added in an amount just sufficient to bring the total water content of the rice up to 65 wt. %. The tray was then immediately sealed by ultrasonically bonding a polypropylene film over the top of the tray. The tray and contents were then left to equilibrate for 30 minutes to 150 minutes at temperatures in the range 40° C. to 80° C.

The packaged rice product obtained by this method was ambient stable and had a natural, freshly cooked appearance. It could be reheated for immediate consumption. The reheated product was completely free-flowing. None of the undesirable aroma of prior art ready-to-heat pouched rice was detected. Analysis of the rice aroma by gas chromatography—mass spectrometry (GCMS) showed reduced levels of certain aroma aldehydes relative to conventional, ready-to-heat pouched rice. In particular, levels of heptanal and 2,4-decadienals were reduced. These aldehydes are produced primarily by fat oxidation. The analysis also revealed the absence of certain hydrocarbon (alkane) components that are present in the conventional pouched ready-to-heat rice products. It is thought that these alkane components may be derived from the packaging material under the conventional high-temperature sterilization conditions.

The above embodiment has been described by way of example only. Many other embodiments falling within the scope of the accompanying claims will be apparent to the skilled reader.

The invention claimed is:

1. A method for the production of a stabilized, full moisture, ready-to-heat packaged food product comprising the steps of:
   filling a tray with a predetermined quantity of food starting material comprising at least 90% by weight of a dry starchy component, wherein the dry starchy component comprises whole rice grains selected from the group consisting of long-grain rice, basmati rice, Thai rice, wild rice, Arborio rice, and combinations thereof that are fully milled or have part or all of a bran layer attached,
   wherein the dry starchy component has a starting moisture content of less than 30 wt %;
   followed by performing the following steps in sequence while maintaining the tray in a sterile environment;
   (a) treating the food starting material with high-temperature pressurized steam in a pressure vessel at a temperature of from about 125° C. to about 150° C. immediately before a dosing step in order to sterilize the food starting material;
   (b) in the pressure vessel at a pressure of from about 0.5 Mpa to about 1.0 Mpa and at a temperature of from about 125° C. to about 150° C., dosing the sterile food starting material inside said tray with a predetermined amount of sterile water to provide the food starting material with a final moisture content of 50 to 75% wherein the food starting material is dosed such that there is no excess water in the tray;
   (c) in the pressure vessel, after step (b), applying a lid to the tray to seal the food starting material inside the tray wherein the pressure vessel having a pressure of from about 0.5 Mpa to about 1.0 Mpa and at a temperature of from about 125° C. to about 150° C., and then cooling the food starting material to a temperature less than 100° C. in the pressure vessel; and
   (d) after step (c) removing the sealed tray of food starting material from the pressure vessel and holding the sealed tray at atmospheric pressure and in an environment at 25° C.-80° C. for a period of from about 20 minutes to about 4 hours, thereby producing the stabilized full moisture, ready-to-heat packaged food product,
   wherein the duration of the process from the start of step (a) to the completion of step (c) is less than about 10 minutes.

2. A method for the production of a stabilized, full moisture, ready-to-heat packaged food product comprising the steps of:
   filling a tray with a predetermined quantity of food starting material comprising at least 90% by weight of a dry starchy component, wherein the dry starchy component comprises whole rice grains selected from the group consisting of long-grain rice, basmati rice, Thai rice, wild rice, Arborio rice, and combinations thereof that are fully milled or have part or all of a bran layer attached,
   wherein the dry starchy component has a starting moisture content of less than 30 wt %;
   followed by performing the following steps in sequence while maintaining the tray in a sterile environment;
   (a) treating the food starting material with high-temperature pressurized steam in a pressure vessel at a temperature of from 125° C. to about 150° C. immediately before a dosing step in order to sterilize the food starting material;
   (b) in the pressure vessel at a pressure of from about 0.5 Mpa to about 1.0 Mpa and at a temperature of from about 125° C. to about 150° C., dosing the sterile food starting material inside said tray with a predetermined amount of sterile water to provide the food starting material with a final moisture content of 50 to 75% wherein the food starting material is dosed such that there is no excess water in the tray;
   (c) in the pressure vessel, after step (b), applying a lid to the tray to seal the food starting material inside the tray wherein the pressure vessel having a pressure of from about 0.5 Mpa to about 1.0 Mpa and at a temperature of from about 125° C. to about 150° C., and then cooling the food starting material to a temperature less than 100° C. in the pressure vessel; and
   (d) after step (c) removing the sealed tray of food starting material from the pressure vessel and holding the tray of food starting material at atmospheric pressure and in an environment at 25° C.-80° C. for a period of from about 20 minutes to about 4 hours, thereby producing the stabilized full moisture, ready-to-heat packaged food product,
   wherein at least a portion by weight of the food starting material is not subjected to a wetting or soaking step prior to step (a).

3. The method of claim 1, wherein the step of applying the lid to the tray to seal the food starting material inside the tray is performed not more than about 2 minutes after said step of dosing.

4. The method of claim 1, wherein the step of applying the lid to the tray to seal the food starting material inside the tray is performed not more than about 1 minute after said step of dosing.

5. The method of claim 1 or 2, wherein the whole rice grains are the long-grain rice and wherein the removing of the sealed tray of food starting material from the pressure vessel and the holding of the tray of food starting material at the atmospheric pressure and in the environment is at 55° C. for the period of 30 minutes followed by 15 minutes at 45° C., thereby producing the stabilized, full moisture, ready-to-heat packaged food product.

6. The method of claim 1 or 2, wherein the whole rice grains are the basmati rice and wherein the removing of the sealed tray of food starting material from the pressure vessel and the holding of the tray of food starting material at the atmospheric pressure and in the environment is at 75° C. for the period of 30 minutes followed by 30 minutes at 45° C., thereby producing the stabilized, full moisture, ready-to-heat packaged food product.

7. The method of claim 1, wherein a total residence time of said tray inside the pressure vessel is from about 30 seconds to about 5 minutes.

8. The method of claim 2, wherein a total residence time of said tray inside the pressure vessel is from about 30 seconds to about 5 minutes.

9. The method of claim 2, wherein the step of applying the lid to the tray to seal the food starting material inside the tray is performed not more than about 2 minutes after said step of dosing.

10. The method of claim 2, wherein the step of applying the lid to the tray to seal the food starting material inside the tray is performed not more than about 1 minute after said step of dosing.

* * * * *